Patented Nov. 21, 1950

2,531,197

UNITED STATES PATENT OFFICE 2,531,197

ASYMMETRICAL DICHLOROETHYLENE/ISO-BUTYLENE INTERPOLYMERS

Merlin Martin Brubaker, Chadds Ford, and Ralph Albert Jacobson, Landenberg, Pa., assignors to E. I. du Pont de Nemours & Company, Wilmington, Del., a corporation of Delaware No Drawing. Application March 29, 1946, Serial No. 658,232

3 Claims. (Cl. 260—87.7)

This invention relates to interpolymers of asymmetrical dichlorethylene with isobutylene. More particularly, it relates to such interpolymers which predominate in dichlorethylene.

Polymerized asymmetrical dichlorethylene is known but since it is quite insoluble in the common organic solvents cannot advantageously be employed as a coating composition nor for the formation of sheets, films, foils, or thin layers.

An object of this invention is to provide polymers from asymmetrical dichlorethylene which have good solubility in common organic solvents. Another object is to provide modified asymetrical dichlorethylene polymers which can readily be coated or extruded to form thin coatings or sheets. A further object is to provide modified asymmetrical dichlorethylene polymers which form thin coatings which retain the high degree of water-impermeability characteristic of polymerized asymmetrical dichlorethylene but have improved solubility characteristics. A still further object is to provide such modified polymers which have good solubility in common solvents and can be readily and economically applied as a surface coating or cast into films. Still other objects will be apparent from the following description of the invention.

It has been discovered that asymmetrical dichlorethylene can be polymerized with a small to moderate proportion, e. g., 5 to 30%, of isobutylene at room or elevated temperatures and under pressure in the presence of a polymerization catalyst to form novel interpolymers which are useful as coating and casting compositions. Thin sheets or layers composed of the novel interpolymers are strong and clear and possess excellent moisture-proofing characteristics. They are quite soluble in a number of commercially available solvents including methyl ethyl ketone, methyl propyl ketone, cyclohexanone, dioxane, xylene, and ethylene dichloride, compatible mixtures of the above solvents, and mixtures of other solvents such as 60/40 acetone/toluene mixtures.

The polymerization reaction is preferably carried out in a closed reaction vessel free from oxygen in a liquid medium. An inert solvent or diluent or an aqueous dispersion is desirable because it allows intimate contact between the reactants. The reaction is accelerated by the presence of certain catalysts including ozone, organic and inorganic peroxy compounds. Actinic light, e. g., light of wavelengths from 1800 to 3600 Å, also accelerates the reaction.

A practical method of making the interpolymers is as follows: A mixture of liquid isobutylene and asymmetrical dichlorethylene containing 5 to 30 parts of the former by weight per 95 to 70 parts of the latter is added to 2 to 5 times its volume of an aqueous medium containing about 1 to 5% by weight based on the monomer mixture of a dispersing agent and 0.1 to 2% by weight based on the monomer mixture of a peroxy compound in a suitable pressure vessel which is provided with a means of agitation, such as stirring or shaking, and means for heating and cooling. Atmospheric oxygen can first be removed from the vessel by flushing with nitrogen. The mixture is then agitated vigorously to promote emulsification. It is thereafter heated at a temperature in the range of about 20° C. to 80° C. with constant or intermittent agitation until the polymerization has proceeded to the desired extent. A reaction period may run from 5 to 200 or more hours.

The dispersing agents used should be acid stable; that is, their surface-active or dispersing properties should not be adversely affected in media of mild acidity, e. g., pH 3.5. The n-alkane sulfonic acid and sulfuric acid alkali metal and ammonium salts having 10 to 18 carbon atoms and the C- and N-alkyl betaines of 12 to 20 carbon atoms are especially useful.

The invention will be further illustrated by the following examples. All parts are by weight.

*Example I*

A solution of 24 parts of a dispersing agent containing about 32% active ingredient which consists mainly of the sodium salt of sulfonated paraffin white oil (described in United States Patent 2,228,598) in 222 parts of water is prepared by warming on the steam bath and charged into a suitable pressure vessel. The solution is cooled below the boiling point of isobutylene and 1.2 parts of ammonium perdisulfate, 1 part of sodium bicarbonate, 96 parts of asymmetrical dichlorethylene, and 20 parts of isobutylene added in the order named. The air in the reaction vessel is flushed out with nitrogen and the vessel closed. The vessel is agitated at 45° C. for 192 hours. The unreacted isobutylene is then allowed to evaporate and steam is passed into the mixture to volatilize unpolymerized asymmetrical dichlorethylene monomer. The polymerization mixture is then cooled to 50° C. and 20 parts of 10% aluminum sulfate solution added with stirring to coagulate the dispersion. The product which separates is filtered, thoroughly washed with water, and dried. There is obtained 108 parts of interpolymer containing about 14% isobutylene by weight based on chlorine analysis. The interpolymer is soluble in methyl ethyl ketone, dioxane, xylene, cyclohexanone, and ethylene dichloride.

*Example II*

A solution of five parts of commercial cetane sodium sulfate (23% sodium cetane sulfate, 77% water) and one part of ammonium persulfate in 200 parts of water is frozen in a pressure vessel. The vessel is then charged with 35 parts of asymmetrical dichlorethylene and 12 parts of liquified isobutylene and the air of the vessel is displaced with isobutylene vapors. The vessel is closed and heated at 45° C. with agitation for 48 hours. The resulting dispersion is diluted with water to four times its original volume and steamed to expel the residual monomers. The interpolymer is coagulated from the hot emulsion by the addition with vigorous stirring of 200 parts by volume of saturated sodium chloride solution. The precipitated polymer is filtered, washed thoroughly with hot water, and dried. The final product is a tan-colored amorphous powder and amounts to 32 parts by weight. It is soluble in methyl ethyl ketone and methyl ketone/toluene (60/40) mixture and contains 62.16% chlorine as determined by analysis. From the chlorine content it is calculated that this polymer contains 85% asymmetrical dichlorethylene by weight.

When an 0.00007 inch layer of this polymer was coated from methyl ethyl ketone/toluene (60/40) solution on both sides of 0.005 inch thick cellulose acetate photographic film base, the resulting composite film swelled 0.01% when immersed in water for one hour at 25° C. as contrasted to a swelling of 1.7% for uncoated base.

*Example III*

Example II is repeated using seven parts of the cetane sodium sulfate mixture, one part of ammonium persulfate, 200 parts of water, 36.5 parts of asymmetrical dichlorethylene, 13.5 parts of isobutylene, and the polymerization is allowed to proceed at 45° C. for 63.5 hours. The product is a light-yellow amorphous powder obtained in 83% yield. It is soluble in methyl ethyl ketone and 60/40 methyl ethyl ketone/toluene mixture. It contains 60.5% chlorine by analysis from which it is calculated that the interpolymer contains 82.6% asymmetrical dichlorethylene by weight.

Cellulose acetate photographic film base coated with this polymer, as described in Example II, swelled 0.03% when immersed in water at 25° C. for one hour.

Polymerization catalysts useful in practicing the invention include the organic peroxy compounds, e. g., dibenzoyl peroxide, certain inorganic peroxy compounds, e. g., hydrogen peroxide, and the water-soluble salts of perdisulfuric acid. In addition to the ammonium salt disclosed in the examples, there may also be used the sodium, potassium, lithium, barium, and calcium perdisulfates. It is known that the sulfate ion appears in aqueous solutions of perdisulfates. For this reason, while the water-soluble alkaline earth metal salts are operable, they are not usually used because of their tendency to form a precipitate of the corresponding alkaline earth sulfate. The preferred salts are the ammonium and alkali metal salts. Ammonium perdisulfate is especially suitable because of economic considerations.

The concentration of perdisulfate salt employed may be varied within wide limits. For instance, amounts of perdisulfates varying from 0.1% to 10% of the quantity of monomer employed are operable. In respect to economy of catalyst, quality of product, and rapidity of polymerization, the preferred proportion of perdisulfate salts lies in the range of 0.1% to 4% based on weight of monomer.

The operability of the invention is not confined to any particular proportion of polymerizable monomer or monomers relative to the amount of aqueous media present. Thus, the ratio of the aqueous to the non-aqueous phase may vary between approximately 10:1 and 1:1. In general, it is preferred that the aqueous/non-aqueous ratio shall be approximately 4:1 to 1:1 since for a given reaction vessel the time-space yield is greatly reduced by the use of higher ratios. It is also helpful in maintaining an emulsion if the proportion by weight of non-aqueous phase is not greater than 1:1.

The presence of oxygen in the polymerization vessel may adversely affect the rate of polymerization and, in addition, may have an adverse effect on properties of polymers, such as result from cross-linking and attendant insolubility. It is, therefore, normally preferable to displace the air from the polymerization vessel. This may be done by means of a gas which does not retard the rate of polymerization. Suitable gases are nitrogen, carbon dioxide, methane, and helium. These gases may be passed through the free space of the polymerization vessel until the air has been completely displaced.

The interpolymers containing 5 to 30% isobutylene and 95 to 70% of asymmetrical dichlorethylene are of use for water-proof coatings, either when applied as lacquers or from emulsions or pastes. Interpolymers containing less than about 30% isobutylene are usually amorphous powders and form highly desirable continuous films when cast from solutions in suitable solvents while those containing more than about 30% isobutylene usually tend to be wax-like solids or sticky gums at ordinary temperatures and form sticky films when cast from solution. Interpolymers containing less than about 5% isobutylene resemble the unmodified asymmetrical dichlorethylene in their unfavorable solubility characteristics in the common organic solvents. The interpolymers containing about 10 to 25% of isobutylene are particularly useful for moisture and/or water barriers with respect to physical characteristics of the polymer, water-impermeability, and solubility characteristics for application from organic solvents.

As many widely different embodiments of this invention can be made without departing from the spirit and scope thereof, it is to be understood that the invention is not to be limited except as defined by the claims.

This application is a continuation-in-part of our copending application Serial Number 462,752, filed October 20, 1942.

What is claimed is:

1. An interpolymer consisting of interpolymerized asymmetrical dichlorethylene and isobutylene containing 5 to 30% of the latter by weight.

2. An interpolymer consisting of interpolymerized asymmetrical dichlorethylene and isobutylene containing 10 to 25% of the latter by weight.

3. A process for producing an interpolymer of asymmetrical dichlorethylene and isobutylene comprising interpolymerizing a mixture of monomers consisting of from 70 to 95% asymmetrical dichlorethylene and 30 to 5% of isobutylene by means of a peroxide catalyst and with the application of heat.

MERLIN MARTIN BRUBAKER.
RALPH ALBERT JACOBSON.

REFERENCES CITED

The following references are of record in the file of this patent:

UNITED STATES PATENTS

| Number | Name | Date |
|---|---|---|
| 2,328,510 | Thomas | Aug. 31, 1943 |
| 2,388,138 | Greenewalt | Oct. 30, 1945 |